(12) United States Patent
Michaelis

(10) Patent No.: US 7,216,223 B2
(45) Date of Patent: May 8, 2007

(54) CONFIGURING MULTI-THREAD STATUS

(75) Inventor: Scott Lynn Michaelis, Plano, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 412 days.

(21) Appl. No.: 10/836,987

(22) Filed: Apr. 30, 2004

(65) Prior Publication Data

US 2005/0251670 A1  Nov. 10, 2005

(51) Int. Cl.
*G06F 1/24* (2006.01)

(52) U.S. Cl. .................................. 713/100; 713/1

(58) Field of Classification Search ............... 713/1, 713/100; 712/15, 43, 229
See application file for complete search history.

(56) References Cited

U.S. PATENT DOCUMENTS

| | | | |
|---|---|---|---|
| 6,052,708 A * | 4/2000 | Flynn et al. ................. | 718/108 |
| 6,418,442 B1 | 7/2002 | Dwyer III | |
| 6,697,935 B1 | 2/2004 | Borkenhagen et al. | |
| 6,954,846 B2 * | 10/2005 | Leibholz et al. .............. | 712/43 |
| 2003/0149716 A1 * | 8/2003 | Peterson ..................... | 709/101 |
| 2004/0215939 A1 * | 10/2004 | Armstrong et al. ......... | 712/220 |

\* cited by examiner

*Primary Examiner*—Thuan Du

(57) ABSTRACT

One exemplary method for configuring multi-thread status in a system having a core with multi-thread capability which comprises the steps of selecting a desired multi-thread status from either enabled status or disabled status and configuring the core to the desired multi-thread status.

20 Claims, 8 Drawing Sheets

CONFIGURING MULTI-THREAD STATUS

BACKGROUND

Computing architectures that operate efficiently and that can process large volumes of data quickly are often preferred over their counterparts. Additionally, it is often desired to operate a variety of tasks, using a variety of computer resources, simultaneously within a computer system. Accordingly, developing complex multiprocessor systems has been the subject of significant research.

One recent development is the advent of processor chips that contain multiple processors on a single chip. Each individual processor is known as a core. Each core on a silicon chip operates as an individual processor.

Additionally, the concept of threads has been developed in order to increase the efficiency of individual processors or processor cores. The term thread is used to define the number of execution strings that can be processed simultaneously within a processor or processor core. In a traditional core, instructions are executed sequentially, with the execution of one instruction completed before execution of a subsequent instruction begins. Often, however, a particular instruction may interact with various other components in the system (e.g., data must be read from a fixed drive, etc.). This can cause the core to reside in a waiting state for several clock cycles until the desired data is retrieved. By enabling a core to run more than one string of execution instructions simultaneously, the time lost waiting for actions such as data retrieval can be reduced. When one string of instructions, or thread, reaches a state where a wait cycle would occur, the core can switch to another thread and continues to process instructions. In this manner, core processing capabilities are increased.

Threads are beneficial in increasing the speed at which certain applications run on the core. Other applications, however, can theoretically be slowed by a core that runs multiple threads. Applications such as some database programs are designed to operate on multiple cores at the same time. These applications view each thread in a multi-thread core as another available core that can process a string of executable instruction. Because, however, a thread does not have the same processing capabilities as a complete core processor (i.e., a thread must share the core with one or more other threads), these applications are slowed by using multi-thread cores instead of employing additional cores. As a result, multiple threads can be undesirable for particular applications.

In systems that run applications where multiple threads are not advantageous, it is often desired to disable the multi-thread capability of a processor core. Core manufactures currently offer cores that can have their multi-thread capabilities disabled before shipping to the customer. This is usually done using a fuse within the chip. A voltage is used to "blow" the fuse to disable the multi-thread capability. This, however, is a permanent configuration. Once the multi-thread capability has been disabled in this manner, it cannot readily be enabled at a later time.

Because it is rarely possible to know which application will be run on a system at system installation time, and many systems will run numerous types of applications, system efficiency is reduced by choosing an enabled/disabled multi-thread state when a system is installed.

SUMMARY

An exemplary method for configuring multi-thread status in a system having a core with multi-thread capability may comprise the steps of selecting a desired multi-thread status from either enabled status or disabled status and configuring the core to the desired multi-thread status.

An exemplary system may comprise a core having configurable multi-thread capability wherein the multi-thread capability resides in a status of enabled or disabled, a multi-thread status register for the core wherein a value stored in the register is indicative of the status of the multi-thread capability of the core, and a multi-thread configuration region coupled to the multi-thread status register wherein a value stored in the multi-thread configuration region is read into the multi-thread status register to configure the status of the core.

BRIEF DESCRIPTION OF THE DRAWINGS

For the purpose of illustrating the invention, there is shown in the drawings one exemplary implementation; however, it is understood that this invention is not limited to the precise arrangements and instrumentalities shown.

DETAILED DESCRIPTION

Illustrative Computing Environment

Figure 1:
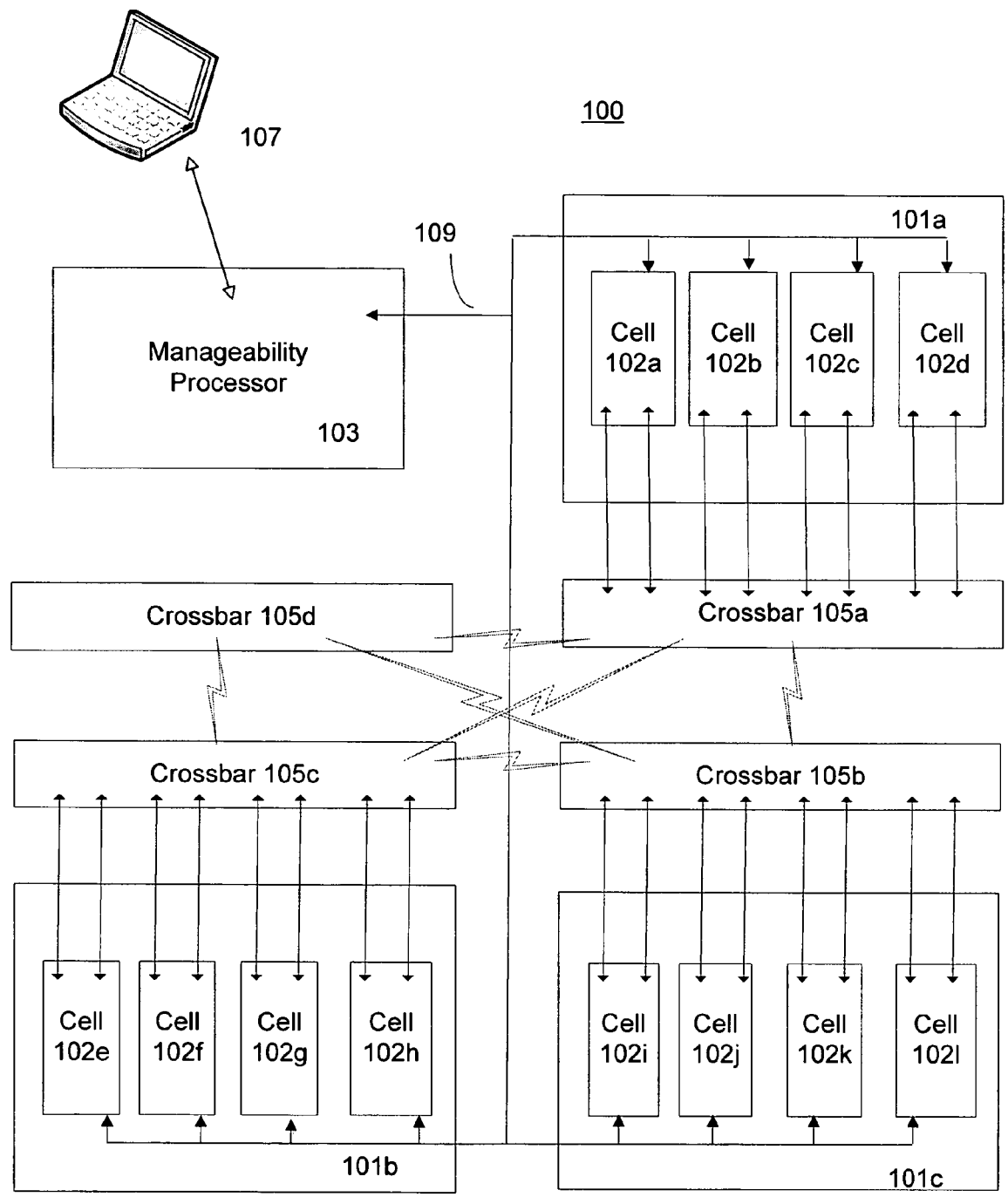
FIG. 1 is a block diagram illustrating an exemplary computer system upon which one implementation of the current invention can operate.

Referring to FIG. 1, an exemplary computing system 100 on which the system and method described herein can operate is shown. FIG. 1 illustrates a scalable, partitionable computer system that includes a plurality of elements or cells. The cells can be configured to form one or more individual logical or virtual machines, referred to as partitions. An example of this type of computing system is the Superdome® system manufactured by Hewlett-Packard (Palo Alto, Calif.).

In the exemplary embodiment shown in FIG. 1, three partitions 101a, 101b, and 101c are shown, with each partition containing four cells. It is understood, however, a number of partitions could be contained within the system, limited only by the total number of cells available, and the number of cells each partition contains could range in number from one cell per partition to the total number of cells in the system all contained within a single partition.

Each partition is a logical separation from the remainder of the system. It may reside on a different physical device, or it may reside on the same physical device as one or more other partitions. Each partition may be dedicated to performing a specific computer function. The functions may be related (e.g., multiple functions used by a single application) or they may be unrelated (e.g., two different operating systems running two completely separate applications).

In the exemplary embodiment shown in FIG. 1, the first partition 101a includes four cells 102a, 102b, 102c, 102d; the second partition 101b includes four cells 102e, 102f, 102g, 102h; and the third partition 101c includes four cells 102i, 102j, 102k, 102l. A partitionable system can be configured to allow each partition to communicate with other partitions, or, alternatively, the partitions can be configured to operate completely independently from one another. Similarly, each cell within each partition may have the ability of communicating with other cells within the system. Communication between partitions and between cells within a partition occurs via one or more routing devices 105a, 105b, 105c, 105d. In the exemplary embodiment illustrated in FIG. 1, the routing device used is a crossbar switch, although it is understood that any other device capable of routing communications could also be used.

A manageability processor 103 controls the system configuration and system overhead processes. The manageability processor 103 is essentially the common "brain" of the system, and handles functions such as establishing the partition boundaries and the level of isolation between them, and also controlling the initial startup/boot process. A user interface 107 is provided to the manageability processor 103 in order to allow a system administrator to configure the system in the desired format (e.g., define partitions and set parameters for each). A graphical user interface (GUI) is used on the user interface 107 to facilitate access by the system administrator, thus allowing the appropriate parameters for the configuration desired to be established. In an exemplary embodiment, the manageability processor 103 is in communication with the cells in the system by a data path 109 created via a USB connection. Once the system administrator selects the desired parameters, the configuration settings are communicated to the individual cells via the USB connection.

Figure 2:
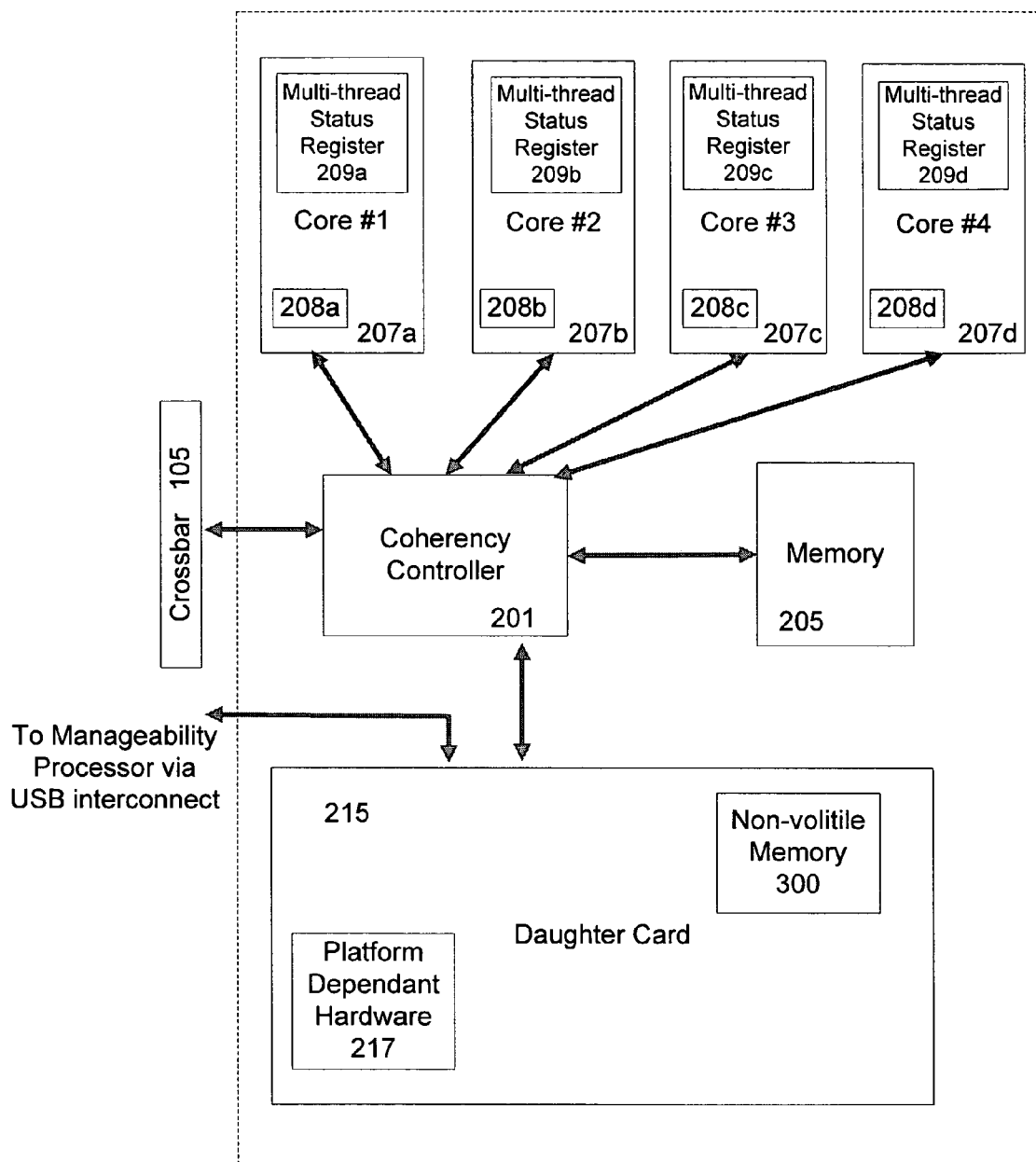
FIG. 2 is a block diagram of an exemplary cell operating on the system shown in FIG. 1.

The configuration information set forth by the system administrator is sent out by the manageability processor 103 and is received and stored in each individual cell. Referring to FIG. 2, a block diagram of the elements included in an exemplary cell capable of operation on the system of FIG. 1 is shown. A coherency controller 201 is used as the center point for data traffic within the cell 102. The coherency controller 201 connects the cell to the rest of the system via a crossbar switch 105 that is part of the switch fabric. Additionally, remote I/O devices can also be coupled to the cell via the coherency controller 201, either directly (I/O devices not shown in FIG. 2) or via the crossbar 105. The coherency controller 201 is coupled to a memory bank 205, which generally comprises one or more types of random access memory modules.

Additional elements of the cell 102 reside on a daughter card 215. Examples of elements contained on the daughter card 215 may include various types of platform dependent hardware 217. For example, the daughter card 215 may include system firmware, one or more flash components, a real time clock, debug UARTs, scratch RAM, etc. Additionally, the daughter card 215 contains one or more non-volatile memory modules 300.

The coherency controller is also coupled to one or more processor cores 207a, 207b, 207c, 207d. The term "core" is used herein to describe a portion of a processor chip having the capabilities of a functionally complete processor. Recent developments have enable chip manufacturers to include more that a single processor in a single chip. Thus, each core is the equivalent of a complete processor; however, two or more cores may reside within a single processing chip. For the purposes of this description, the term core shall be used to refer to a functionally complete processor within a cell. Each core is illustrated as a separate element in the figures; however, it is understood that several cores may reside on a single processor chip.

Multi-Thread Status Configuration

In the exemplary embodiment, each core has multi-thread capability. The multi-thread status of the processor cores 207a, 207b, 207c, 207d is configurable, meaning the cores can operate in either a multi-thread enabled mode or a multi-thread disabled mode. A multi-thread status register 209a, 209b, 209c, 209d is contained on each core 207a, 207b, 207c, 207d. The contents of the multi-thread status register 209a, 209b, 209c, 209d determines if the multi-thread capability of each core is enabled or disabled. A bit is stored in the multi-thread status register 209a, 209b, 209c, 209d to indicate to the core whether the multi-thread capability should be enabled or disabled. In an exemplary embodiment, a "1" is placed in the multi-thread status register 209a, 209b, 209c, 209d to indicate that the core multi-thread status is to be disabled, and a "0" in the multi-thread status register 209A, 209B, 209C, 209D tells the core to operate in the multi-thread enabled mode.

The multi-thread status register is volatile, meaning the contents of the register are lost when power is removed from the core. The register contents, and the corresponding core multi-thread status, reset to a default value during the boot process following power-on. Additionally, a change in the multi-thread status of the core can only be effectuated upon a core reset. For example, if the contents of multi-thread status register are changed following power-on, the multi-thread status is unaffected until the core is reset. In order to allow for a core to be reset, each core contains a reset line 208a, 208b, 208c, 208d. The core is reset by applying a voltage to the reset line, which resets the core and applies the initial default configuration parameters. There are two types of resets that shall be referred to herein. The first is referred to as a "cold reset." A cold reset is when power is first applied to the system, such as during the initial startup phase. The second type of reset is referred to as a "warm reset." A warm reset is when a reset value is applied to the reset line of a core after the system has been powered on.

Figure 3:
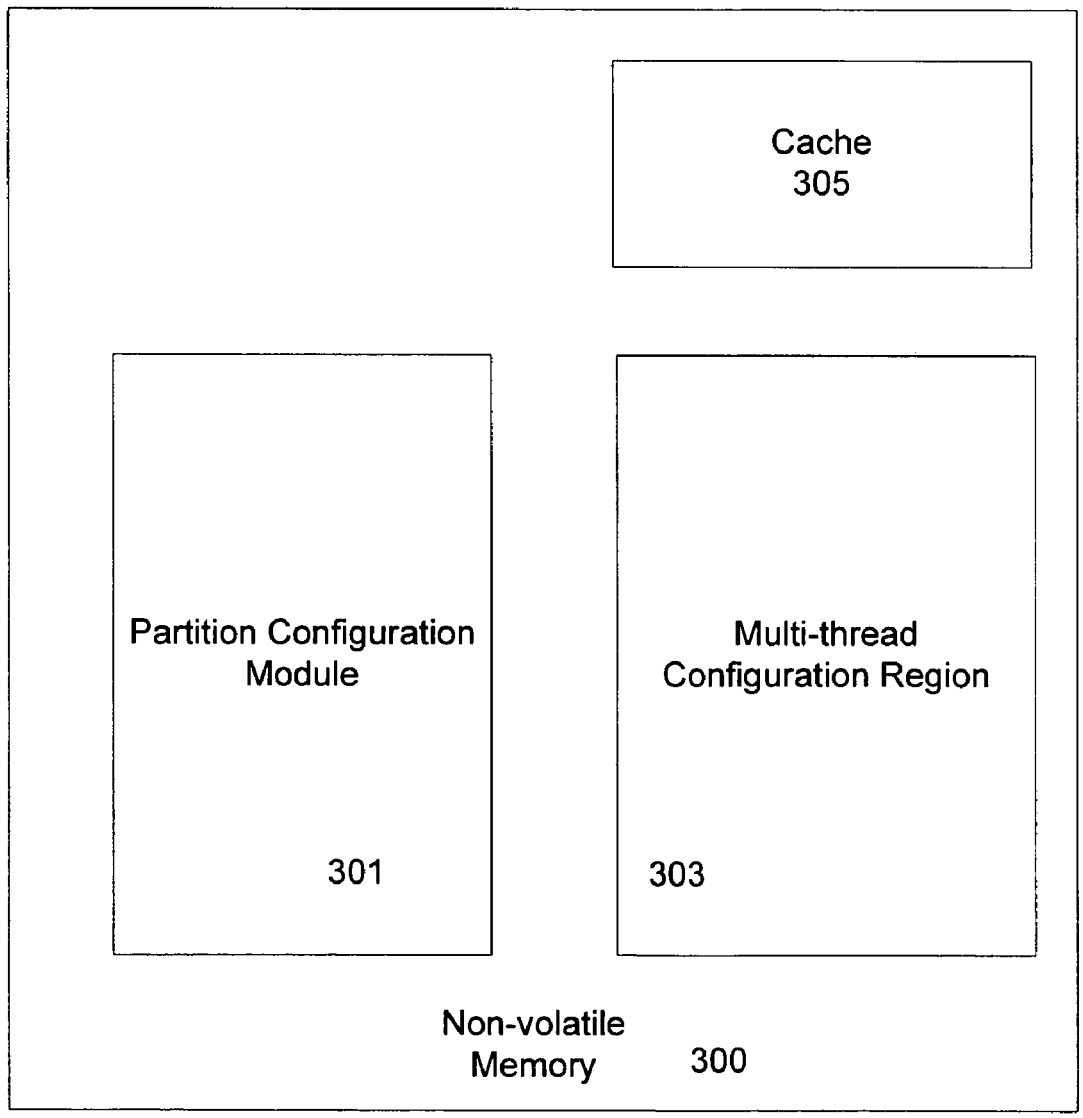
FIG. 3 is a block diagram of the components of an exemplary daughter card contained in a cell as shown in FIG. 2.

Referring now to FIG. 3, an exploded view of an exemplary embodiment of a non-volatile memory module 300 residing on the daughter card 215 is illustrated. The non-volatile memory module comprises at least two memory functions. First, an area of the non-volatile memory 300 is dedicated to storing the partition configuration parameters sent out by the manageability processor 103. This area is shown on FIG. 3 as a Partition Configuration Module 301. Additionally, a multi-thread configuration region 303 resides within the non-volatile memory 300 of the daughter card 215.

The multi-thread configuration region 303 is used to store a value corresponding to the multi-thread status elected by a system administrator for one or more cores. During the configuration process, the multi-thread enabled/disabled selection made by the system administrator will be stored in the multi-thread configuration region 303 and used to set the multi-thread status of one or more cores residing within the cell. In an exemplary embodiment, all cores within a cell and all cells within a particular partition will be set to an equivalent multi-thread state (i.e., all enabled or all disabled). This is often the most advantageous solution, as one partition will likely be used to run one particular application. It is understood, however, that the invention described herein could be used to configure different cells or cores within a partition differently should an application arise in which such a configuration would be desirable.

Figure 4:
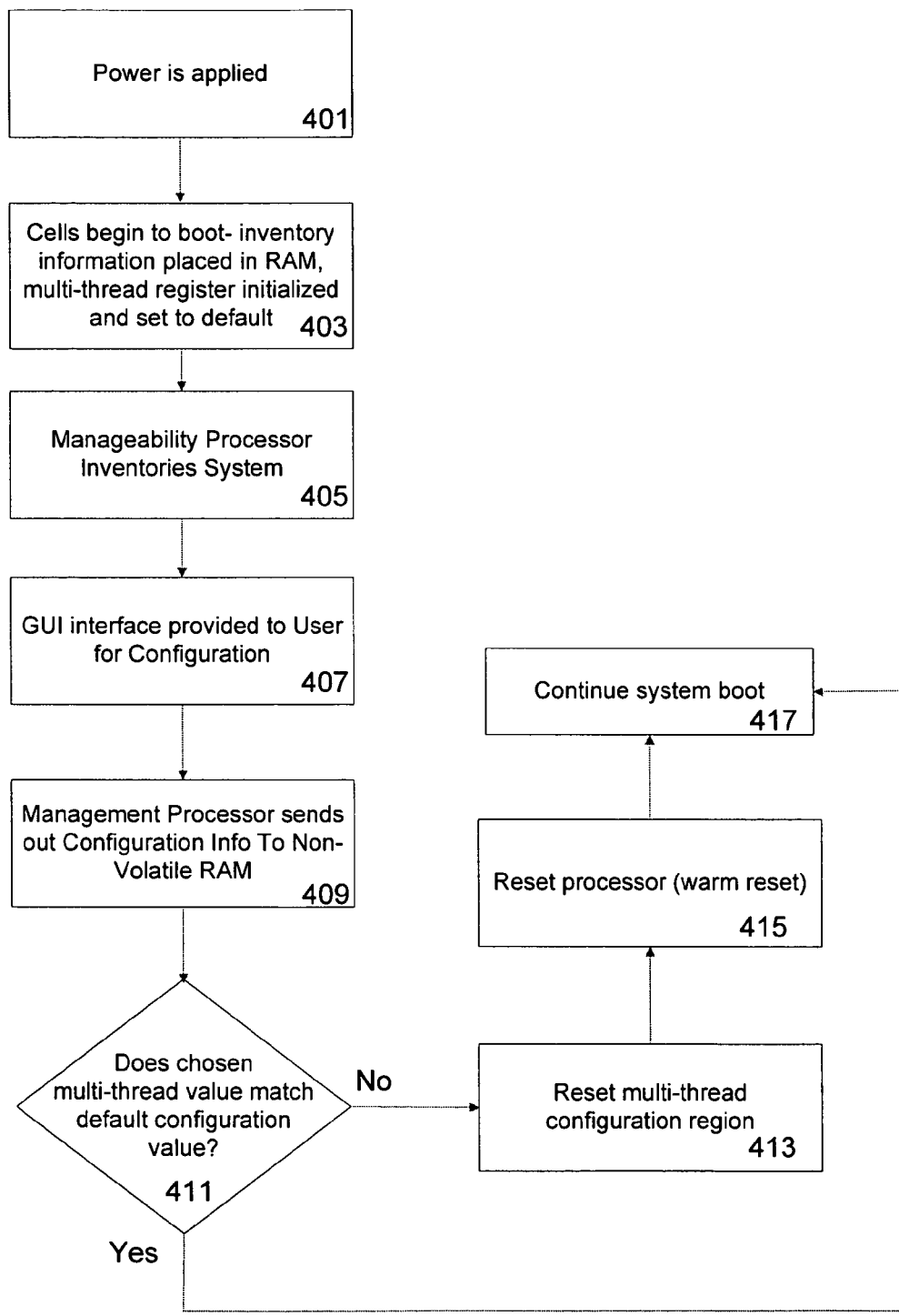
FIG. 4 is flow chart illustrating the steps of an exemplary process for the multi-thread configuring process.

A flow chart illustrating the steps undertaken to configure the multi-thread status at system power-up is shown in FIG. 4. Initially, power is supplied to the system (step 401). When power is applied to the system, the initial system boot process begins. The initial system boot process includes a resource inventory process undertaken within each cell. The results of the inventory process are stored in memory on the daughter card, where access can be obtained by the manageability processor. The multi-thread register on each core is set to the default power-on value, in accordance with the configuration as provided by the core manufacturer (step 403).

The manageability processor inventories the entire system (step 405). This enables the manageability processor to determine what resources are available from which partitions can be configured. This information is provided to the system administrator via the GUI interface. The system administrator enters the desired configuration information, included the partition information and the selected multi-thread status for the partition (step 407).

The manageability processor sends the configuration information to the cells via the system USB interconnect (step 409). The configuration information for the cells is stored in the partition configuration module on the daughter card within the cells. At this point, the collection of cells that comprise the partition is reset to effectuate the configuration selected by the system administrator. A check is performed to see if the status of the core or cores within the partition matches the selected multi-thread status (step 411). If a match exists (i.e., the core's multi-thread status is in the desired state), the boot process is allowed to continue (step 417).

If, however, it is determined that the multi-thread status is opposite from the selected status, the multi-thread status must be switched. This is accomplished by writing the appropriate bit to the multi-thread register on the core (as read from the partition configuration module 301 contained in the non-volatile RAM 300 on the daughter card) (step 413). The core is then reset using a warm rest (i.e., a reset value is applied to the reset input of the core) to effectuate the change in multi-thread status (step 415), and the boot process is allowed to continue (step 417).

One concern with configuring the multi-thread status within a partition in this manner arises from the timing at which the configuration information becomes available. Upon power-on, a cold reset is performed on each core. A multi-thread status must set at that time, thus the core automatically defaults to a pre-determined multi-thread status. The boot process continues, and the manageability processor sends the partition specific configuration information to be stored in the non-volatile memory on the daughter card. The partition specific configuration information includes the multi-thread configuration information for the particular partition. This information is used to reset the multi-thread status of each core if needed, as discussed above. However, the partition specific configuration information does not become valid until the boot process is partially completed. Included in the boot process of each partition is memory initialization and I/O discovery. This process can take several minutes upon the initial boot, and, because the coherency controller and the memory modules within a cell are reset at the same time the core is reset to avoid memory coherency problems, a change to the multi-thread status after waiting for the boot process to complete would cause the memory initialization and I/O discovery to be repeated if a change is made to the core (i.e., the multi-thread configuration is switched). This would create a delay while the system is reboot. Although such a system is within the scope of some embodiments of the invention, in order to minimize the likelihood of a need to reboot, another exemplary embodiment of the invention includes designating a region of the non-volatile memory on the PDH daughtercard as a cache memory (305 on FIG. 3) used to store the multi-thread settings of the cores upon shutdown. Upon initial power-up, the value stored in the cache is representative of the core state prior to shut-down can be used to set the initial status of the core multi-thread configuration. By setting the multi-thread status to the prior status as opposed to allowing the core to reset to the default configuration each time, the number of times re-boot will be needed after the partition specific configuration information is obtained will be limited to only those occasions where the system administrator is altering the multi-thread status configuration. As it is likely that a particular application or operating system will be used for a period of time on a given partition, it is not likely that the multi-thread status will need to be changed in a high percentage of power-on boots.

Figure 5:
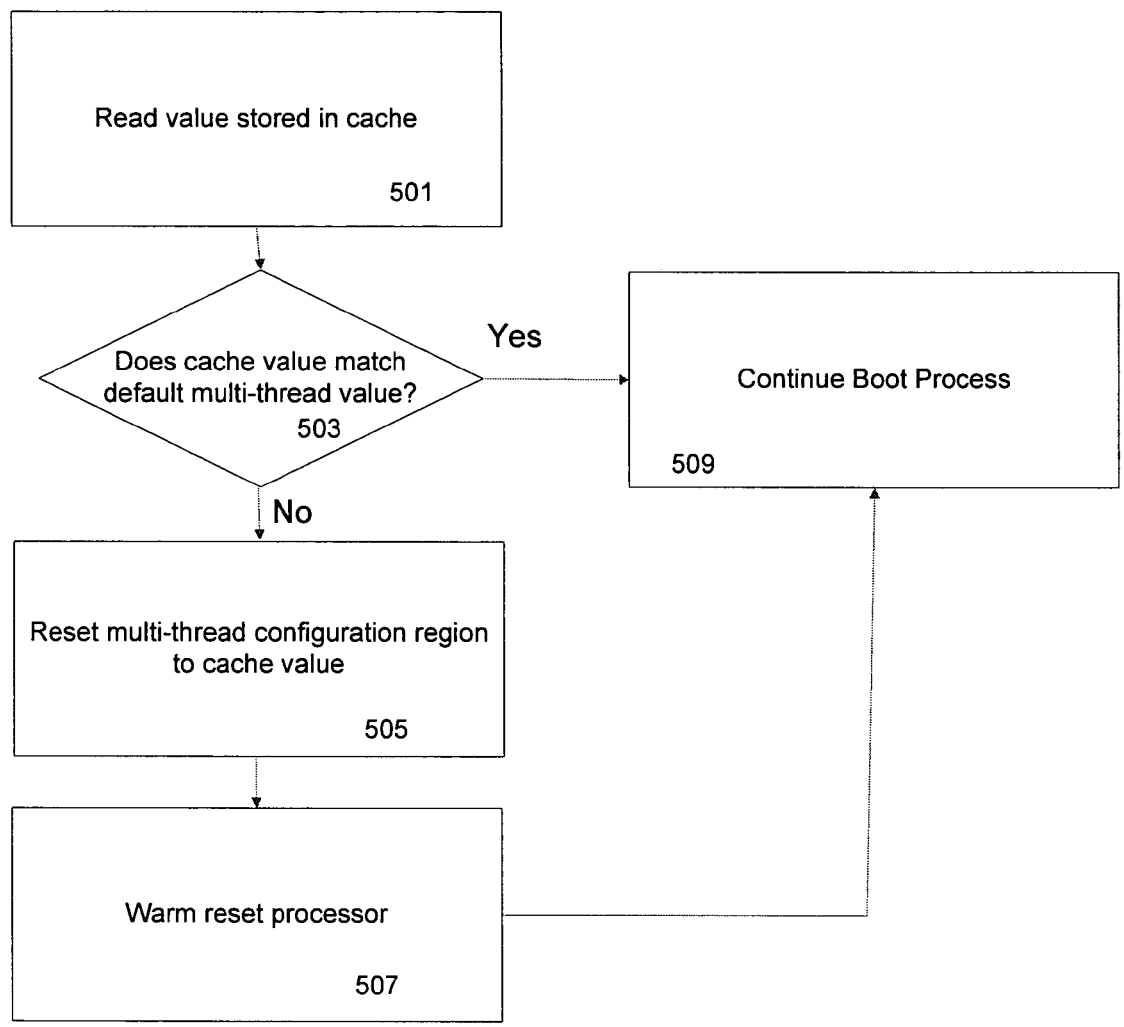
FIG. 5 is a flow chart illustrating the steps of an exemplary process for setting the multi-thread value using a cache memory.

FIG. 5 is a flow chart illustrating the steps involved with using the cache memory to set the initial multi-thread value. Upon power-on, the cache value is read from the cache (step 501). The value in the cache is set to a value that will cause the multi-thread status of the core to be equivalent to the multi-thread status at the previous shutdown. The default multi-thread status value in the core is compared against the cache value (step 503). If the values are the same, the boot process is allowed to continue (step 509). If the value in the cache is not the same as the core multi-thread status default value, the core is configured to match the cache value (step 505). In order to effectuate the change, a warm reset is applied (step 507). Once the warm reset is complete, the cell resumes the boot process (step 509), including I/O discovery and memory initialization.

Using the cache process, the core multi-thread status is always reset to the same status that was present upon the previous shutdown before the boot process is complete. In this embodiment, the only time a reboot including full I/O discovery and memory initialization is needed is when the system administrator selects a core multi-thread status configuration that is not the same as the one present at the previous shutdown. It is likely that this will only occur in a small minority of power-on situations.

Figure 6:
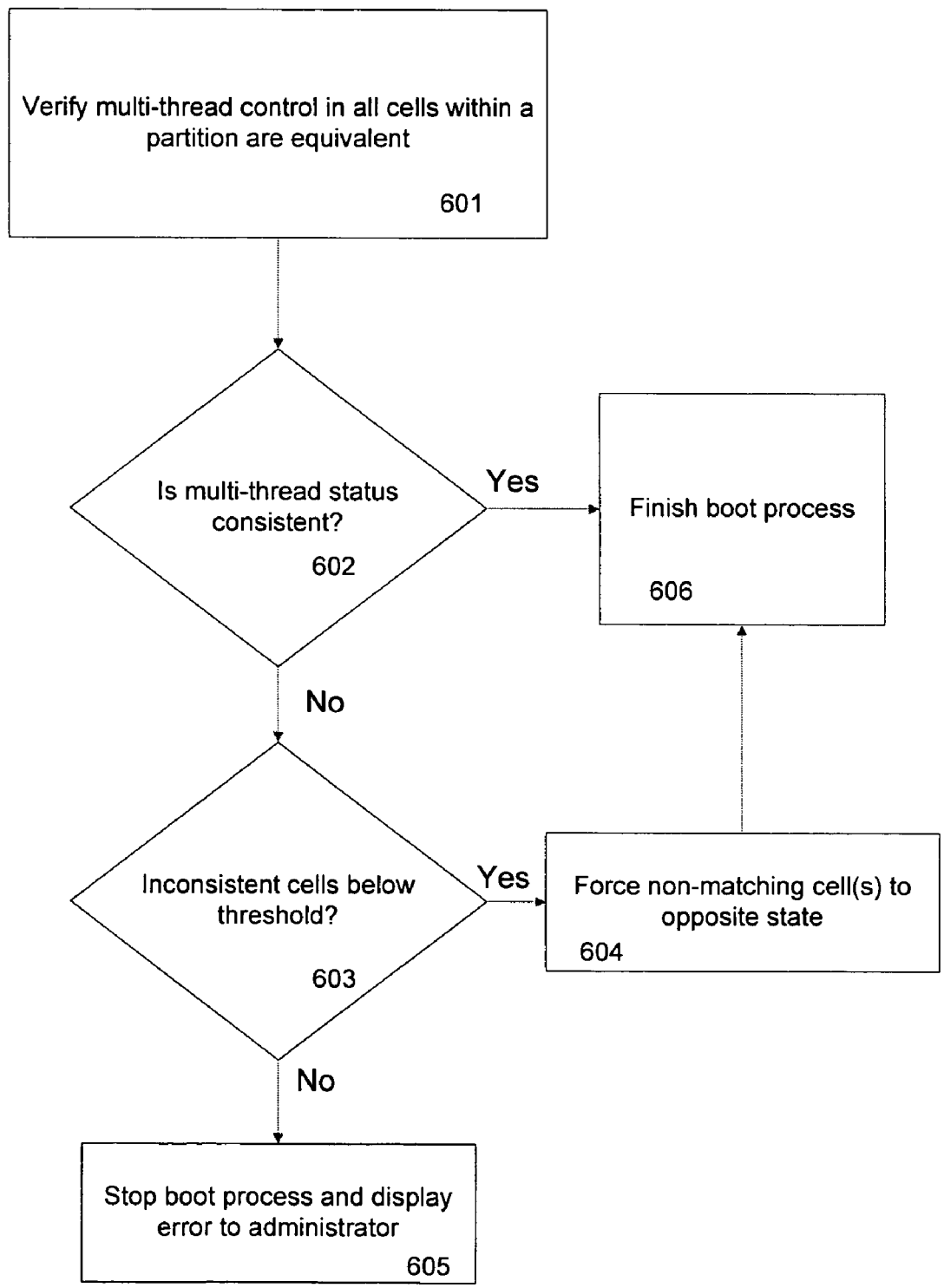
FIG. 6 is a flow chart illustrating the steps of an exemplary process of multi-thread configuration verification.

Some exemplary embodiments described herein have the ability to perform a verification process to ensure that all of the cells within a given partition are configured in the same state and to correct for any discrepancies that exist. Because a partition will generally be optimized to run a single dominant application, it is frequently advantageous to have all of the cells in a single partition configured to have the multi-thread status of the cores within them in an equivalent state. Referring to FIG. 6, a flow chart of the steps included in an exemplary embodiment of the verification process is shown. Once the multi-thread status has been configured in all of the cells that exist within a particular partition, the manageability processor checks the state of each cell within a selected partition (step 601). The status of all of the cells are compared to each other to determine if there is consistency among all cells in the partition (step 602). If the multi-thread status of all cells are consistent, the manageability processor allows the boot process to continue (step 606). If one or more cells reside in a multi-thread status that is not the same as the remainder of the cells in the partition, then corrective action is undertaken. If the number of cells that are inconsistent is below a pre-determined threshold, automatic correction is undertaken (step 603). For example, if one cell in a four cell partition is in a multi-thread status different from the remaining three cells (e.g., one cell has multi-threads enabled and three have multi-threads disabled), and the predetermined threshold has been configured to be 25% of the cells or less, then an automatic correction process occurs wherein the cell in the unmatched state is reconfigured to match the state of the other three (i.e., the multi-threads are disabled in the first cell to cause it to match the remaining three cells) (step 604). After reconfiguring the inconsistent cells, the boot process is allowed to continue (step 606). However, if the inconsistent cells are greater in number than the pre-determined threshold, then input from the system administrator is used to correct the discrepancy. The boot process is halted at this point, and an error message is returned to the system administrator (step 605). At this point, the system administrator will re-start the multi-thread configuration process by re-selecting the desired multi-thread status and re-booting the system.

Figure 7:
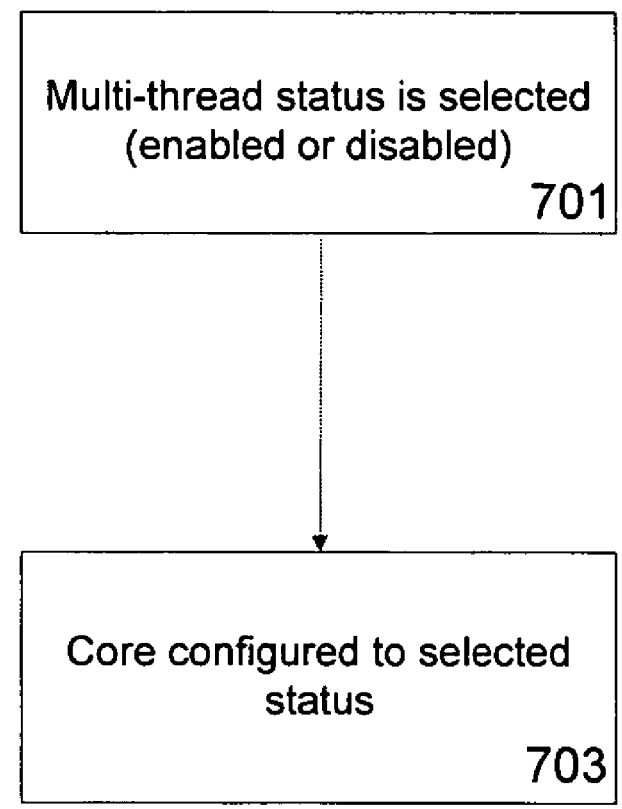
FIG. 7 is a flow chart illustrating the steps of one exemplary implementation of the present invention.

FIG. 7 illustrates the steps involved in an exemplary implementation of the present invention. A system administrator selects the multi-thread status desired for a particular partition (step 701). The multi-thread status of the core or cores residing within the partition are then configured to the status selected by the system administrator (step 703).

Figure 8:
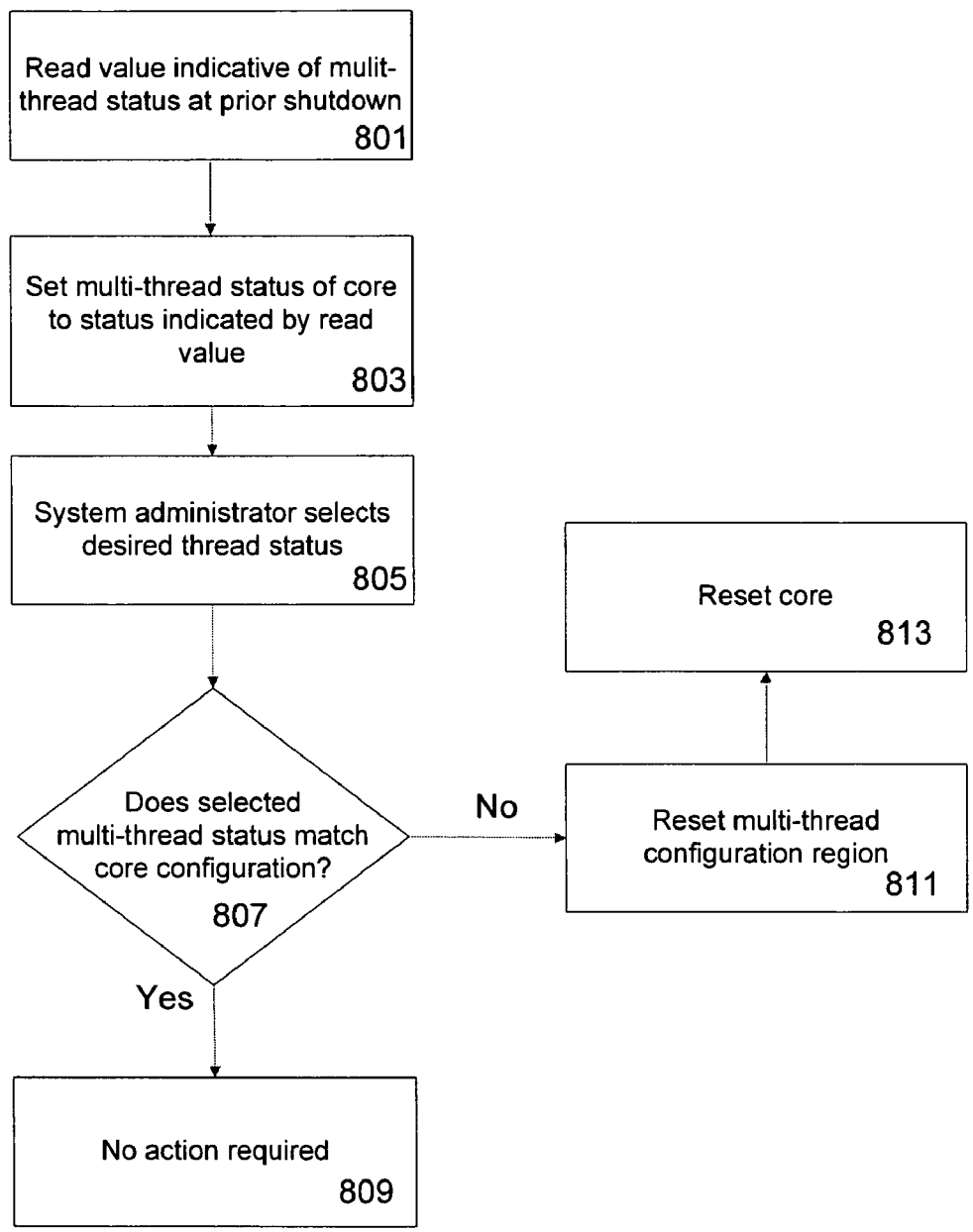
FIG. 8 is a flow chart illustrating the steps of one exemplary implementation of the present invention that uses a stored value indicative of the multi-thread status upon the previous system shutdown.

FIG. 8 illustrates the steps involved in an exemplary implementation of the present invention using a stored value indicative of the multi-thread status of the core upon the previous system shutdown. The stored value is read (e.g., from a cache memory) to indicate the multi-thread status of the core at the previous system shutdown (step 801). Upon power-up, the core status is set to the same status in which it was operating upon the prior system shutdown, as indicated by the stored value (step 803). The system administrator selects the desired multi-thread status for the present system operation (step 805). The selected status is compared to the existing core status, which has been set to be the same as the status upon the previous system shutdown (step 807). If the core resides in the selected status, no further action is required (step 809). If, however, the core does not reside in the selected status, the multi-thread configuration is reset to the selected status (step 811). The core is then reset to effectuate the status change (step 813).

By enabling the system administrator to configure the multi-thread status of the various cores within a partition to be either enabled or disabled, the system administrator can maximize the efficiency of the system by selecting a multi-thread status that is the most desirable for the specific application that will be running on a particular partition. Additionally, by allowing the configuration to be reset, as opposed to the prior art solutions that permanently configured the multi-thread status of a core, system versatility is increased. The system administrator can reconfigure the system each time the task or application to be run is changed.

In addition the specific embodiments described herein, it should be noted that the various techniques of the present invention may be implemented in hardware or software, or a combination of both. Software used may be implemented in various programming languages, including compiled or interpreted languages. Such software may be stored on a computer readable storage medium, where the storage medium is so configured to cause a computer to perform the procedures described above.

Although exemplary embodiments of the invention have been described in detail herein, a variety of modifications to the embodiments described will be apparent to those skilled in the art from the disclosure provided above. Thus, the present invention may be embodied in other specific forms without departing from the spirit or essential attributes thereof and, accordingly, reference should be made to the appended claims, rather than to the foregoing specification, as indicating the scope of the invention.

What is claimed is:

1. A method for configuring multi-thread status in a system having a core with multi-thread capability comprising the steps of:
    selecting a desired multi-thread status from either enabled status or disabled status; and
    configuring said core to said desired multi-thread status, comprising
        comparing said desired status to an existing status of said core;
        changing said existing status of said core if said desired status does not match said existing status; and
        resetting said core.

2. A method as set forth in claim 1, wherein the said comparing step comprises the steps of:
    establishing a multi-thread status region;
    inputting a first bit into said multi-thread status region corresponding to said desired status; and
    comparing said first bit in said multi-thread status region with a second bit in said core representative of said existing status.

3. The method as set forth in claim 2, wherein said multi-thread status region is located in non-volatile memory.

4. The method as set forth in claim 1, wherein said selecting step comprises the steps of:
    providing a GUI interface; and
    selecting a desired multi-thread status selection via said GUI interface.

5. The method as set forth in claim 4, wherein said selecting step further comprises the steps of:
    accessing a manageability processor via said GUI interface; and
    updating said first bit in said multi-thread status region to be representative of said desired multi-thread status selection entered via manageability processor.

6. The method as set forth in claim 1, further comprising:
    setting said desired core multi-thread status to a status representative of the multi-thread status at the prior shutdown of the system prior to said configuring step.

7. The method as set forth in claim 6, wherein a value indicative of said status at the prior shutdown of the system is stored in a non-volatile cache memory and said value is used to set said core multi-thread register status.

8. A method for configuring multi-thread status in a system having a core with multi-thread capability comprising the steps of:
    reading a value indicative of a prior multi-thread status during a prior system shutdown;
    setting a current core multi-thread status to said prior multi-thread status as indicated by said value;
    inputting a selected multi-thread status by a system administrator;

comparing said selected multi-thread status with said current core multi-thread status to determine if said selected multi-thread status is different from said current core multi-thread status;

changing said current core multi-thread status to match said selected multi-thread status if it is determined in said comparing step that said selected multi-thread status is different from said current core multi-thread status; and resetting said core.

9. The method as set forth in claim 8, wherein said resetting step comprises rebooting said system.

10. The method as set forth in claim 8, wherein said system comprises a partition having a plurality of cells with each cell having at least one core, wherein said method further comprises:

determining if said current multi-thread status of each core in each partition is equivalent; and taking corrective action if said current multi-thread status of each core in each partition is not equivalent.

11. The method as set forth in claim 10, wherein said corrective action comprises the following steps:

determining if the number of non-matching cores is below a predetermined level; and changing the current multi-thread status of each non-matching core when the number of non-matching cores is below the predetermined level.

12. The method as set forth in claim 10, wherein said corrective action comprises providing an error message to said system administrator.

13. A system comprising:

a core having configurable multi-thread capability, wherein said multi-thread capability resides in a status of enabled or disabled;

a multi-thread status register for said core, wherein a value stored in said register is indicative of said status of the multi-thread capability of said core;

a multi-thread configuration region coupled to said multi-thread status register, wherein a value stored in said multi-thread configuration region is indicative of a desired multi-thread status;

a status checker operatively associated with the core and the multi-thread configuration region, arranged to compare the status of the core to the value in the configuration region indicative of the desired multi-thread status, and to switch the core to the desired multi-thread status if the status of the core is not equal to the desired status; and a core reset coupled to the core for resetting the core.

14. The system as set forth in claim 13, further comprising a GUI interface for a system administrator to input a multi-thread status selection.

15. The system as set forth in claim 14, further comprising a manageability processor, wherein said manageability processor receives said multi-thread status selection from said GUI interface and distributes said multi-thread status selection to said multi-thread configuration region.

16. The system as set forth in claim 13, further comprising a cache memory, wherein said cache memory stores a value indicative of said multi-thread status of said core upon a previous operation of said system.

17. A computer readable medium having computer readable instructions to instruct a computer to perform a method comprising:

selecting a desired multi-thread status from either enabled status or disabled status; and configuring said core to said desired multi-thread status, comprising comparing said desired status to an existing status of said core;

changing said existing status of said core if said desired status does not match said existing status; and resetting said core.

18. The computer readable medium as set forth in claim 17, wherein said medium has computer readable instructions to instruct a computer to perform a method further comprising:

reading a prior multi-thread status from a cache;

configuring said core to a multi-thread status equal to said prior multi-thread status prior to comparing said desired status to said existing status.

19. A system comprising:

means for inputting a desired multi-thread status;

means for storing a first value indicative of said desired multi-thread status;

means for comparing a current status of a core to the desired multi-thread status;

means for switching the core from the current status to the desired multi-thread status if the current status is not equal to the desired multi-thread status; and means for resetting the core to said desired multi-thread status.

20. The system as set forth in claim 19, further comprising:

means for storing a second value indicative of a prior multi-thread status upon a prior system shutdown;

means for configuring said core to said prior multi-thread status using said second value;

means for comparing said prior multi-thread status with said desired multi-thread status; and means for switching said core from said prior multi-thread status to said desired multi-thread status if said desired multi-thread status is not equal to said prior multi-thread status.

* * * * *